June 11, 1935.　　　　H. J. DILLON　　　　2,004,748
VEHICLE
Filed Sept. 18, 1933　　　3 Sheets-Sheet 1
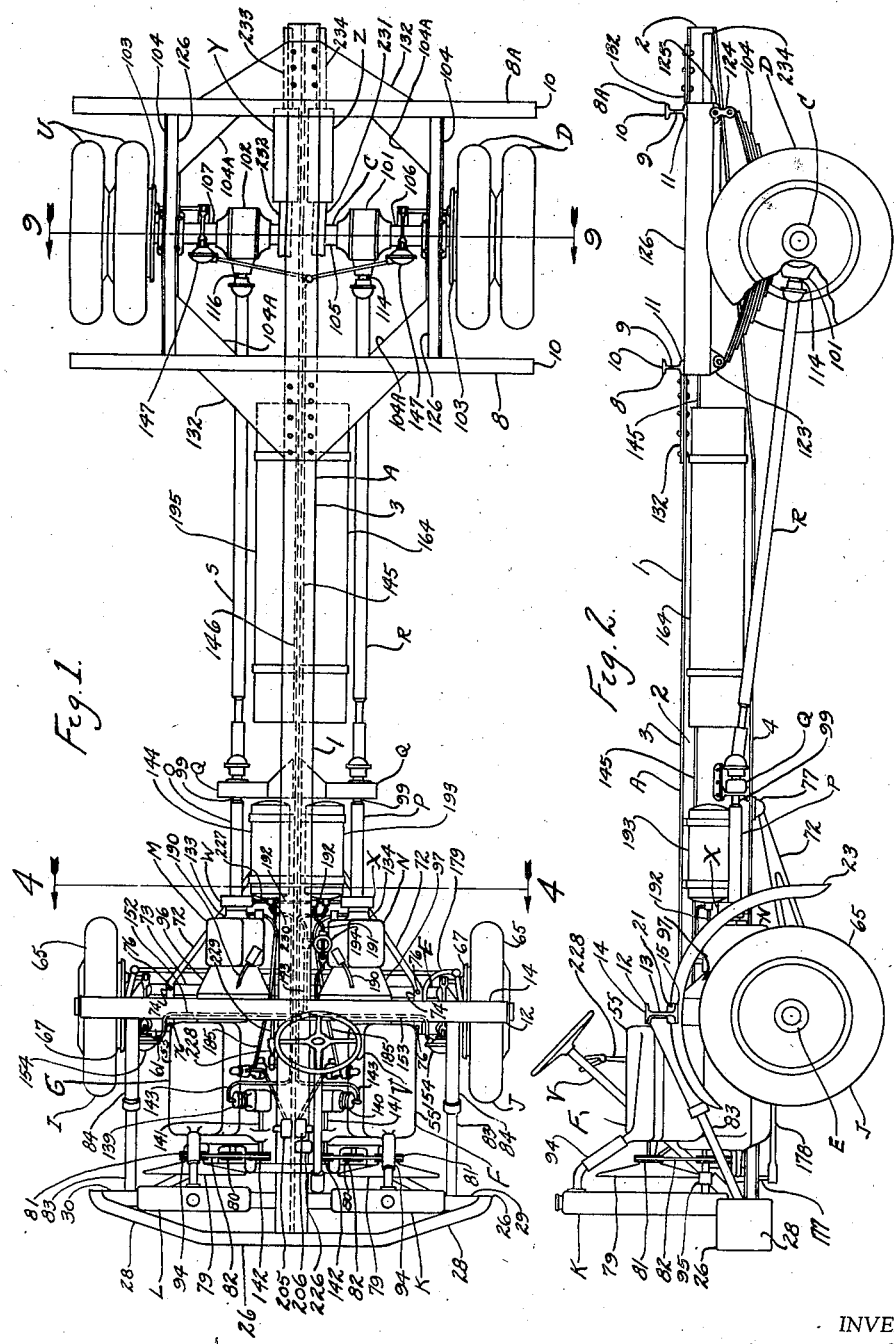
INVENTOR.
Hugh Joseph Dillon
BY
George B. Ingersoll,
ATTORNEY.

June 11, 1935.   H. J. DILLON   2,004,748
VEHICLE
Filed Sept. 18, 1933   3 Sheets-Sheet 2
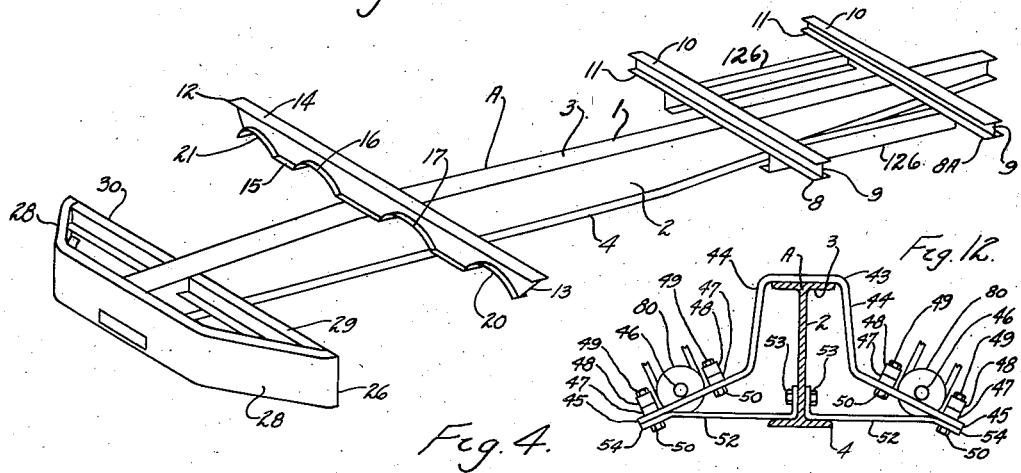
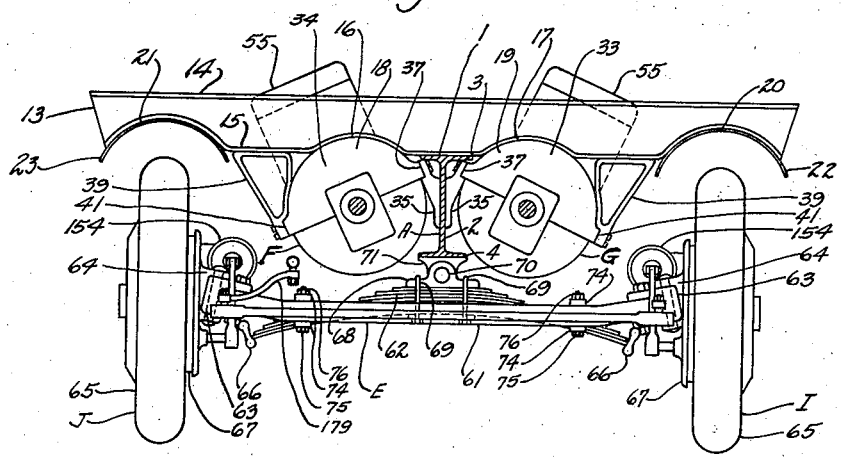
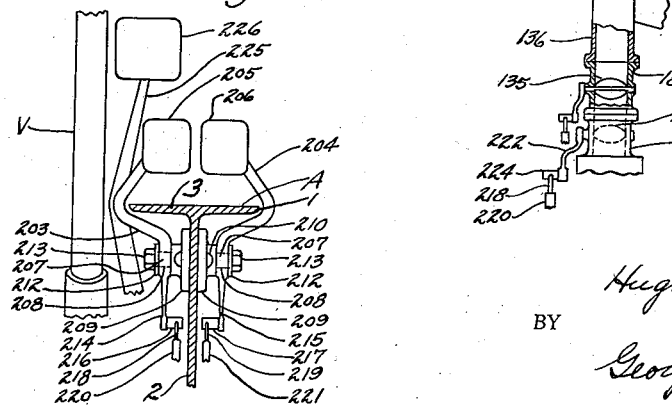
INVENTOR.
Hugh Joseph Dillon
BY
George B. Ingersoll
ATTORNEY.

June 11, 1935. H. J. DILLON 2,004,748
VEHICLE
Filed Sept. 18, 1933 3 Sheets-Sheet 3
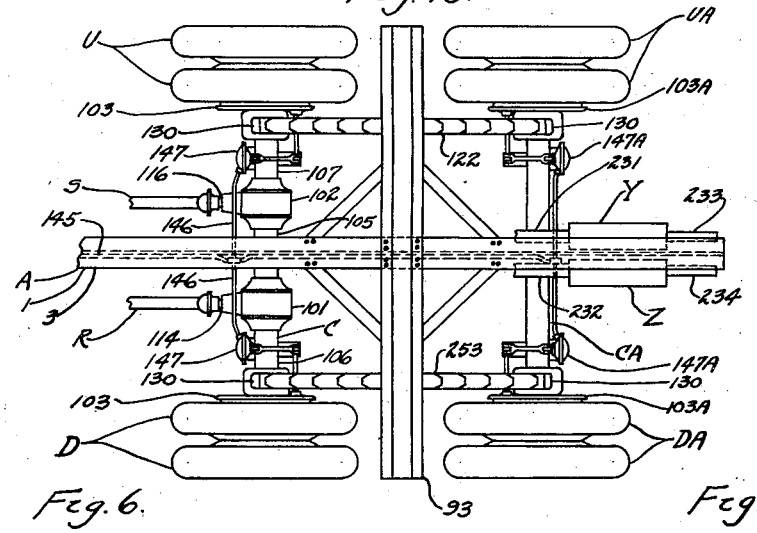
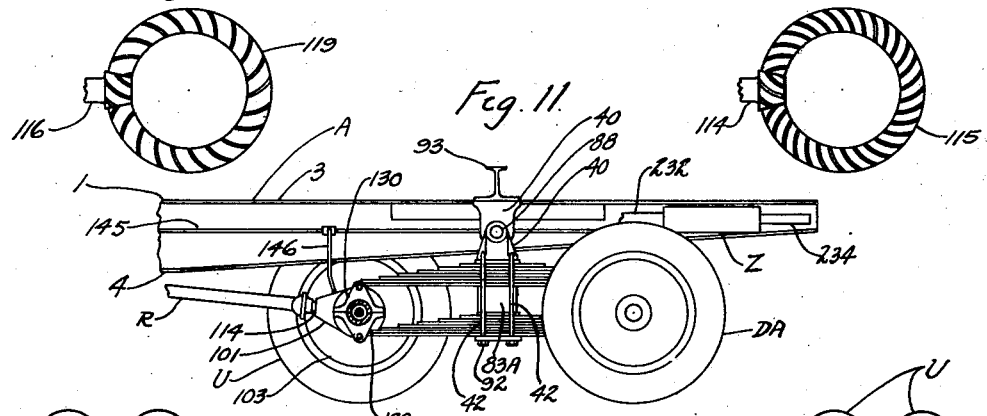
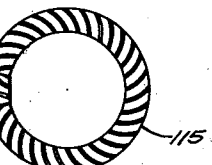
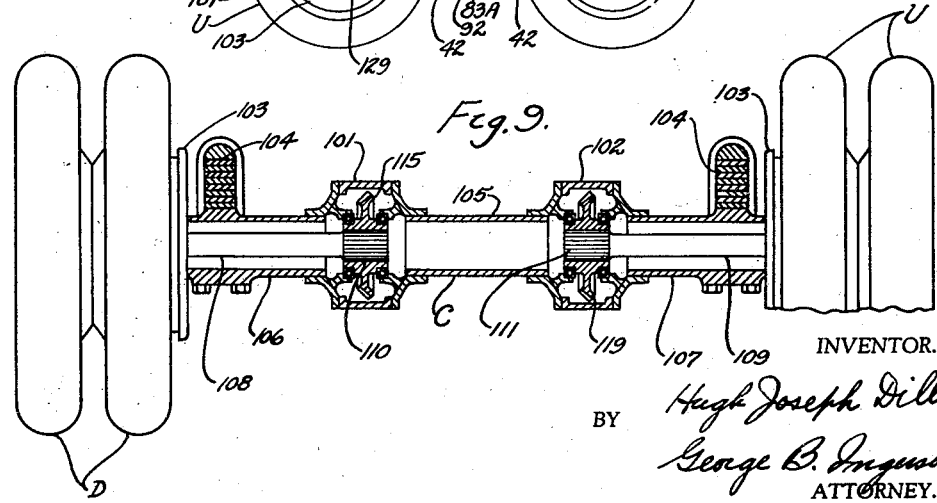
INVENTOR.
Hugh Joseph Dillon
BY George B. Ingersoll
ATTORNEY.

Patented June 11, 1935

2,004,748

UNITED STATES PATENT OFFICE 2,004,748

VEHICLE

Hugh Joseph Dillon, Detroit, Mich.

Application September 18, 1933, Serial No. 689,805

15 Claims. (Cl. 180—54)

My invention relates to vehicles in which a single driving axle is driven by a pair of independently operated engines; and the objects of my improvement are, first, to provide a vehicle having a single driving axle driven by a pair of independently or separately operated engines; second, to provide a vehicle having a single driving axle provided with a pair of driving gear assemblies which are independently mounted in the single driving axle; third, to provide a vehicle having a single driving axle provided with a plurality of driving gear mechanisms of different driving ratios; fourth, to provide a vehicle capable of being driven by means of a single driving wheel assembly; and fifth, to provide a vehicle with driving means arranged to operate without the employment of differential mechanism operatively connected with the driving wheels thereof.

I attain these objects by mechanism illustrated in the accompanying drawings, in which:—

Figure 1 is a plan view of the vehicle; Fig. 2, a side view of the vehicle with one of its rear wheels partially disclosed; Fig. 3, a perspective view of the frame assembly; Fig. 4, a sectional view of the vehicle on the line 4—4, Fig. 1; Fig. 5, a side view of one of the pairs of pinions and ring gears of the driving axle assembly; Fig. 6, a side view of the other of the pairs of pinions and ring gears of the driving axle assembly; Fig. 7, a partial vertical section through the intake mechanism of one of the engine assemblies; Fig. 8, a transverse sectional view of the main frame member and with the throttle control pedals or levers mounted thereon together with a portion of the pedal or lever for controlling the operation of the air brake system and a portion of the steering gear; Fig. 9, a vertical section through a portion of the driving axle assembly taken on the line 9—9, Fig. 1; Fig. 10, a partial plan view of the vehicle when used as a six wheel unit; Fig. 11, a side view of the vehicle as disclosed in Fig. 10; and Fig. 12, a vertical section through the front engine supports and the main frame member.

Similar numerals refer to similar parts throughout the several views.

It is to be understood that the vehicle hereinafter to be described is provided with many units similar to those disclosed and claimed in my application for Vehicle, Serial No. 681,851, filed July 24, 1933, some of these units being namely, the engine assemblies and their accessories, transmissions, propeller shafts and their mountings, gasoline tanks, air tanks, mufflers, radiators, and the front portion of the frame assembly.

Also the front axle assembly hereinafter disclosed is similar to that disclosed and claimed in my application, Serial No. 681,849, filed July 24, 1933.

The above mentioned and similar units, which have been described in detail in the above mentioned applications, will be briefly described herein with sufficient detail to disclose their operative relationship in combination with the new and novel features of the vehicle herein disclosed over the vehicle disclosed in the above mentioned applications.

The vehicle is provided with the frame assembly A which is located so that the main frame member 1 extends longitudinally along the center or approximate longitudinal center of the vehicle and may be constructed of rolled channel I beam section, as disclosed, with a main vertical web 2 and the integral flanges 3 and 4 extending transversely therefrom at the top and bottom of the frame member 1.

The frame assembly A is provided with the rear cross members 8 and 8A which may also be each provided with the vertical web 9 and the flanges 10 and 11 extending therefrom and may be secured to the flange 3 of the frame member 1 by welding, riveting, or other suitable or similar means, the rear cross members 8 and 8A being preferably located at points slightly ahead and slightly behind the center of the rear axle assembly C. The front cross member 12 may also be provided with the vertical web 13 and the upper and lower flanges 14 and 15 extending therefrom and may be secured to the flange 3 of the frame member 1 by welding, riveting, or other suitable or similar means, the front cross member 12 being preferably located directly over the center of the front axle assembly E.

The lower flange 15 of the frame cross member 12 is provided with the curved or depressed surfaces 16 and 17 for receiving and engaging similar surfaces on the housings 18 and 19 of the engine assemblies F and G.

The frame cross member 12 may be further provided with the curved or depressed surfaces 20 and 21 for receiving and engaging the fenders 22 and 23 which may be suitably secured thereto.

The bumper member 26 is suitably secured to the front portion of the frame member 1 and is provided with the angularly positioned or rearwardly inclined portions 28 which may be so located as to conform with the shape or outline of the cab unit which is disclosed and claimed in my application for United States patent, Serial No. 681,850, filed July 24, 1933.

The rearwardly inclined portions 28 of the bumper 26 are connected at their rear extremities with the members 29 and 30 which extend to and are suitably connected with the frame member 1 as by welding or other suitable means.

The housings 18 and 19 of the engine assemblies F and G are provided with curved surfaces which engage and fit with the similar surfaces 16 and 17 of the frame cross member 12 and are supported therein by the inner brackets 35 which are suitably secured to the web 2 of the main frame member 1, said inner brackets 35 being further suitably secured to the inner supporting arms or portions 37 of the engine or bell housings 33 and 34.

The housings 18 and 19 of the engine assemblies F and G are further supported in the curved surfaces 16 and 17 of the front cross member 12 by the outer support brackets 39 which are suitably secured to the lower flange 15 of the front cross member 12, the outer support brackets 39 being further suitably secured to the outer supporting arms or portions 41 of the engine or bell housings 33 and 34. The engine assemblies F and G are thus located and mounted on each outer side of the main or central frame member 1 and each of said engine assemblies F and G are rendered readily removable from their mountings without lifting over the usual side rails of a conventional frame assembly in which a pair of side rails are located at the extreme outer sides of a frame assembly.

The engine assemblies F and G are further supported at their front portions by the bracket member 43, which may be constructed in one piece and straddle mounted over the main frame member 1, as disclosed in Fig. 12, the bracket member 43 being suitably secured to the flange 3, the bracket member 43 being provided with the downwardly extending portions 44 which are in turn provided with the portions 45 which may extend under the crankshaft extensions 46 of the engine assemblies F and G to support the blocks or members 47, which may be constructed of resilient material, such as rubber composition or similar material, the blocks 47 engaging the lugs 48 which may be formed integrally with or suitably attached to the forward portions of the housings of the engine assemblies F and G, the portions 45, the blocks 47 and the lugs 48 being secured together by the bolts 49 and the nuts 50, which when removed permit the front portions of the engine assemblies F and G to be readily removed from their supported positions in a similar manner as above described relative to the rear support mechanism of the engine assemblies F and G. The brackets 52 may be used to support the portions 45 of the brackets 43, the brackets 52 being provided with the flange portions 53 for suitable attachment to the web 2, the brackets 52 being further provided with the portions 54 for connecting to the portions 45 of the brackets 43 by welding or other suitable means, the bolts 49 being adapted to further extend through the portions 54.

It is to be noted that the engine assemblies F and G, by the above described mechanism, will be supported in angular positions relative to one another and to the main frame member 1, the engine assemblies F and G being herein disclosed as having their cylinder portions 55 supported approximately at an angle of thirty-five degrees from a vertical line, the angle of inclination of the engine assemblies F and G being varied to suit various engines and vehicles.

It is to be noted that the above disclosed angular positions of the engine assemblies F and G will provide sufficient room or passage therebetween to permit the operator or driver of the vehicle to enter and pass between the engine assemblies F and G, to a driver's seat within a cab enclosure which is disclosed and claimed in the above mentioned application for United States patent Serial No. 681,850.

The front axle assembly E herein disclosed is of the type disclosed and claimed in above mentioned application for United States patent for Spring and axle construction for vehicles, Serial No. 681,849 and comprises a pair of axle beam members 61 and 73 connected at their ends by the bracket members 63 on which are pivotally supported the spindle members 64 which operatively support the wheel assemblies I and J which are provided with the front wheels 65 and the brake drums 67.

The front spring 62 is located between the axle beam members 61 and 73 and extends transversely to the main frame member 1 and is connected to the bracket members 63 by the shackles 66.

The front spring 62 is connected at the spring seat 68 by the spring clips 69 and the spring seat 68 is pivotally mounted on the pin 70 which is suitably secured in the bracket 71 which is suitably secured to the lower flange 4 of the main frame member 1.

The torque member 72 is provided with the upper and lower flange portions 74 which are secured to the axle beam members 61 and 73 by the bolts 75 and the nuts 76.

The torque member 72 extends diagonally and rearwardly from the axle beam members 61 and 73 to a point below the lower flange 4 of the main frame member 1 to which it is pivotally connected by the bracket 77 which is suitably supported on the lower flange 4. The radiator assemblies K and L are mounted in upright and vertical positions at each side of the main frame member 1, at the center of the vehicle, and are suitably secured to the upper flanges of the members 29 and 30, the radiator assemblies K and L being located, relative to the engine assemblies F and G, so as to be positioned adjacent to and slightly ahead of the fans 79 which are suitably connected with and operatively driven by the pulleys 80 which are suitably mounted on the crankshaft extensions 46, the pulleys 80 and the pulleys 81 of the fans 79 being operatively connected by the belts 82. The radiator assemblies K and L are suitably connected at their upper portions with the cylinder portions 55 by the flexible hoses 94 and at their lower portions with the lower portions of the engine assemblies F and G with the flexible hoses 95.

To further brace and support the bumper 26, the telescoping members 83 and 84 may be operatively connected and mounted between the cross member 12 and the members 29 and 30 as disclosed in said application, Serial No. 681,851.

It is to be noted that my invention comprises two separate and independent engine or motor assemblies F and G, or power plants, which are not operatively connected with each other through any form of power transmitting units such as transmissions, clutches, rear axles, etc. or through any accessories such as carburetors, throttle mechanism, etc., each engine or motor assembly or power plant separately and independently driving one of the pairs of gear mechanisms in the single driving axle assembly C, both of said power plants being adapted, however, to be operated together, to simultaneously drive the vehicle when desired.

The engine assemblies F and G are respectively provided with the clutch housings 96 and 97 suitably supported thereon and enclosing a suitable and conventional type of clutch mechanism which operatively connects the engine assemblies F and G with the transmission assemblies M and N, which are supported on the clutch housings 96 and 97.

The propeller shaft assemblies O and P are respectively operatively connected with and supported, at their front ends, on the transmission assemblies M and N and are supported, at their rear ends on the bearing assemblies Q, which are suitably attached to the frame assembly A, the inner races of which are mounted and suitably secured on the extensions 99 of propeller shaft assemblies O and P.

The propeller shaft assembly R is operatively connected with and suitably supported at its front end, on the extension 99, of the propeller shaft assembly P and is operatively connected with and supported, at its rear end, on the pinion shaft 114 which is suitably mounted in the driving gear housing 101 of the single driving axle assembly C and operatively engages the ring gear 115 of said driving axle assembly C.

The propeller shaft assembly S is operatively connected with and supported, at its front end, on the extension 99 of the propeller shaft assembly O and is operatively connected with and supported at its rear end, on the pinion shaft 116 which is suitably mounted in the driving gear housing 102 of the single driving axle assembly C in a manner similar to that disclosed relative to the propeller shaft assembly R, the pinion shaft 116 being suitably mounted in the single driving axle assembly C and operatively engaging the ring gear 119.

It is to be noted that the driving axle assembly C is not provided with any differential mechanism operatively connected with the ring gears 115 and 119 which are suitably and respectively mounted in the driving gear housings 101 and 102, the rear driving axle assembly C being provided with the wheel assemblies U and D and the brake drums 103 which are operatively driven by the ring gears 115 and 119.

The driving axle assembly C is suitably connected with the rear springs 104 each of which is pivotally connected with the bracket 123, at its front end, and to the shackle 124, at its rear end, said shackle 124 being pivotally connected with the bracket 125, the brackets 123 and 125 being suitably connected to the frame members 126 which extend between and are suitably and respectively connected with the frame cross members 8 and 8A.

The gusset members 104A may be suitably connected to the frame members 126 and the frame cross members 8 and 8A at the intersections thereof.

The rear frame cross member 8 and 8A may be braced by the gusset members 132 which may be secured at their outer ends to the rear frame cross members 8 and 8A and at their inner ends to the main frame member 1, the frame cross members 8 and 8A being reinforced by the frame members 126 extending longitudinally relative to and adjacent the springs 104.

It is to be noted that the driving pinion 114 of the driving axle assembly C will be provided with the same number of teeth as the pinion gear 116 of the driving axle assembly C, and the ring gear 115 of the driving axle assembly C will be provided with a greater number of teeth than the ring gear 119 of the rear driving axle assembly C, this being clearly diclosed in Figs. 5 and 6. An identical number of teeth in the above mentioned pinions and a different number of teeth in the above mentioned ring gears will provide a higher axle driving ratio for the wheel assembly D than will be obtained by the driving pinion 116 and the ring gear 119 which drive the wheel assembly U.

It is also to be noted that to operate the vehicle in my invention with the different rear axle ratios, as above disclosed, the engine assemblies F and G will be governed to revolve at different speeds. The road speed, however, of the rear driving axle and its driving wheel assemblies U and D and the vehicle will be the same, each engine assembly F and G applying different torque to the rear driving gear mechanisms because of the different ratios in each of the rear driving gear mechanisms as above described.

It is to be understood that the higher and lower ratio mechanisms of the single driving axle assembly may be located as above described with the lower gear ratio mechanism operatively connected with the wheel assembly U or the lower gear ratio mechanism may be operatively connected with the wheel assembly D and the higher gear ratio mechanism then operatively connected with the wheel assembly U. With the driving gear mechanisms as above described and disclosed in the drawings, the engine assembly G will be governed to operate at a lower speed than the engine assembly F to compensate for the difference in the gear ratio mechanisms of the single driving axle assembly C.

It will thus be seen that the driving power of the engine assemblies F and G will be respectively transmitted through gear mechanisms in the transmission assemblies M and N so that either one of the two engine assemblies F and G may be selectively operated to propel the vehicle through a single gear driving mechanism or both of the engine assemblies F and G may be operated collectively to propel the vehicle through both of the driving gear mechanisms of the single driving axle assembly C.

Thus with my invention one engine assembly only may be used to propel the vehicle when it is on level roadways, while both engine assemblies may be used together to propel the vehicle when maximum driving power is needed because of heavy loads, bad roadways, or highway grades, etc.

It will thus be seen that my invention will provide a means of conserving fuel or gasoline, or other fuels used to operate the engines by permitting the simultaneous driving operation of both of the gear driving mechanisms in the single driving axle C only when they are both needed for heavy or maximum pulling conditions.

It is to be noted that the engine assemblies F and G will be operated entirely separate from one another and will not be synchronized to operate at the same speeds as has been the custom with dual engine vehicles heretofore.

In order to further permit the engine assemblies F and G to be operated entirely independent as regards any interconnected power transmitting devices or accessory control units, the transmission assembles M and N are each provided with a power operated gear shift mechanism which may be of the standard or conventional design, the power control utilizing either vacuum or air and being controlled by conventional push button control mechanism, arranged so that each of the transmission assemblies M and N can be shifted independently or separately relative to each other and yet be operated simultaneously.

Also if desired the power operated gear shifting mechanism of the transmission assemblies M and N may be of the mechanically operated type, utilizing centrifugal control means for shifting the various gear members into mesh and in accordance with the predetermined speed of the vehicle, the flexible shaft control unit 190 being disclosed in Fig. 1, the clutch mechanism in such mechanism being located if desired in the rear portions of the transmission assemblies M and N in a conventional manner.

In order to further provide for the separate control of the engine assemblies F and G, the speed control governors 133 and 134 will be suitably mounted at the rear of the transmission assemblies M and N to operate the flexible shaft mechanism 185 or similar or suitably mounted members connecting the speed control governors 133 and 134 respectively with the governing throttle 135, which may be located in the housing 186 suitably connected with intake manifolds 136 of the engine assemblies, and suitably connected between the carburetors 137 and the manifolds 136, the intake manifolds 136 being suitably located in a fore and aft direction relative to the cylinders 55 and also suitably located relative to the longitudinal center of the bores of the cylinders 55.

The flexible shafts or similarly connected mechanism thus provide a driving connection between the control governors 133 and 134, thus being controlled by the speed of the vehicle to further control the operation of the engine at the desired operating speed thus enabling one of the assemblies F or G to run idle if desired, while the other of the engine assemblies is still pulling at full power.

It is to be noted that the vehicle will be equipped with two independent air brake systems in which the air compressors 140 and 139 will be respectively and operatively mounted on the engine assemblies F and G, the compressors being suitably operated by means of the shafts 141 and the pulleys 142, the pulleys 142 being suitably driven by the belts 82. The air compressors 139 and 140 will be suitably connected by the pipes or tubing 143 with the air storage tanks 144 and 193 which are suitably supported from and at the sides of the main frame member 1, the air storage tanks 144 and 193 being further connected by the pipes 191 and 192 to the air control valve 194 which is suitably and further connected by the pipes or tubings 145 and 146 to the air diaphragms 147 which are suitably mounted on the single driving axle assembly C and by suitable linkage further operate in a conventional manner, the suitably mounted brake mechanisms enclosed in the brake drums 103.

The air control valve 194 is further suitably connected by means of the pipes or tubings 143, 152 and 153 to the air diaphragms 154 which are suitably and operatively mounted on the front axle assembly E and are suitably connected and adapted by links and shaft members to operate brake mechanisms enclosed within the brake drums 67 of the front axle assembly E.

It is thus to be seen that with both of the engines F and G operating simultaneously or with either one of the engines F and G in operation, brake applications may be made on all of the four wheels of the vehicle simultaneously.

The fuel tanks 164 and 195 may be suitably supported in a similar compact and protected manner from and adjacent the sides of the main frame member 1.

The fuel tanks 164 and 195 and the air tanks 144 and 193 will be of such size and shape as to provide operating clearance relative to the propeller shaft assemblies O, P, R and S.

The steering gear assembly V may be suitably supported from the web 2 of the main frame member 1 and may be operatively connected, by the steering drag link 178, to the steering arm 179 of the front axle assembly E, the steering drag link 178 being operatively connected to the steering gear arm 177 of the steering gear assembly V.

The pedal or lever members 203 and 204 are respectively provided with the pads 205 and 206 which are located adjacent one another and also are preferably located in alignment in a plane extending transversely relative to longitudinal center of the vehicle to permit the foot of the operator of the vehicle to be placed in an operative position separately on either of the pads 205 or 206 or on both of the pads 205 or 206 simultaneously, thus enabling the operator to optionally accelerate or decelerate one or both of the engine assemblies F and G to control the operation of the vehicle. The pedals 203 and 204 are each provided with the bosses or hubs 207 which engage and pivotally operate on the shaft portions 208 of the brackets 209 which may be secured to the web 2 of the main frame member 1 by the rivets 210, the bosses 207 engaging and being retained by the washers 212 which are retained by the nuts 213 which may suitably engage the shaft portions 208 as by threading or similar means.

The pedals 203 and 204 are respectively provided with the arms 214 and 215 in which are rotatably mounted the members 216 and 217 to which are suitably connected the flexible shafts 218 and 219 suitably mounted in the flexible conduits 220 and 221, the flexible shafts 218 and 219 being respectively connected with the levers 222 suitably mounted in the carburetors 137 of the engine assemblies F and G, and operatively connected with the fuel throttles 223 of the carburetors 137, the lever arms 222 each being provided with the rotatably mounted members 224 for operatively connecting with the flexible shafts 218 and 219.

The pedal or lever member 225, provided with the pad 226, may be pivotally mounted on the main frame member 1 in a manner similar to the pedal or lever members 203 and 204 and is operatively connected with the air control valve 194 to permit manual control of the application of the air brakes in the brake system of the vehicle.

The transmission assemblies M and N are respectively provided with the propeller shaft brake assemblies W and X which may be operatively mounted in a conventional way on the transmission assemblies M and N and will be operatively connected together by a suitably mounted shaft 227, which may extend through the main frame member 1, and be further operatively connected with the brake lever 228 by the rod 229 and by suitable lever mechanism, the hub portion of which is indicated at 230, the brake lever 228 being suitably and operatively mounted on the main frame member 1, both of the propeller shaft brake assemblies being capable of being operated simultaneously by the brake lever 228.

The muffler assemblies Y and Z may be mounted at the rear end of the main frame member 1 and in a manner similar to that disclosed relative to the air tanks 144 and 193, the muffler assemblies Y and Z being mounted between the flanges 3 and 4 of the frame member 1 and are respectively connected, by the muffler pipes 231 and 232 with the exhaust portions of the engine assemblies F and G, the muffler assemblies Y and Z being respectively provided with the tail pipes 233 and 234.

It is also to be further noted that one only of the transmission assemblies M or N will be provided with a conventional free wheeling mechanism, the transmission assembly provided with said free wheeling mechanism being the one that is operatively connected with the driving gear mechanism having the lower gear ratio mechanism, the transmission assembly M thus being, in the vehicle as disclosed, the one provided with said free wheeling mechanism.

It is thus to be noted that with one only of the transmission assemblies, namely M, thus being provided with a free wheeling mechanism and with the engine assembly G being governed to a predetermined maximum speed of operation, that when the vehicle has attained a predetermined road speed, the engine assembly G will be automatically relieved, by the free wheeling mechanism, from driving the driving wheels D, the engine assembly G then continuing to operate at an idling speed, the engine assembly F continuing to drive the driving wheels U and in turn the vehicle, until the road speed falls below a predetermined amount at which time the engine assembly G will again automatically resume its driving operation of the vehicle in conjunction with the engine assembly F. It is to be noted that my invention will thus provide means for utilizing automatically one or both of the engine assemblies F and G to most economically drive the vehicle according to the load and speed requirements of the vehicle.

It is to be noted that the single rear driving axle assembly C will be provided with the pair of driving gear mechanisms suitably and respectively mounted in the driving gear housings 101 and 102, one of the driving gear mechanisms being operatively connected with and for driving the wheel assembly D, the other of the driving gear mechanisms being operatively connected with and for driving the wheel assembly U. It is also to be noted that neither of said driving gear mechanisms of the single axle assembly C are provided with any differential gear mechanism conventionally used to operatively connect a pair of driving wheel assemblies, and also that there is no driving shaft or similar driving means operatively connected between the driving gear mechanisms, this being clearly disclosed in Fig. 9. The driving gear housings 101 and 102 are connected by the housing or tubular member 105 which extends within and is suitably connected with said housings 101 and 102 which are in turn suitably connected with the end housings 106 and 107 on which are suitably and respectively mounted the driving wheel assemblies D and U which are in turn respectively driven by the shafts 108 and 109, the shafts 108 and 109 being provided with the spline portions 110 and 111 which are operatively connected with the central hub portions of the driving ring gears 115 and 119.

If it is desired to use the above mentioned driving means in a six wheel vehicle, the axle assembly CA is installed in conjunction with the driving axle assembly C as disclosed in Figs. 10 and 11, the axle assemblies C and CA being suitably secured to the brackets 40 by the springs 122 and 253, by the spring clips 42, the spacer members 83A and the nuts 92, the brackets 40 being pivotally mounted on the shafts 88 which are suitably secured in the brackets 40 which are in turn suitably secured to the rear frame cross member 93 which may be preferably located directly over the center between the driving axle assembly C and the trailing axle assembly CA in a manner similar to that disclosed in the above mentioned application, Serial No. 681,851.

The springs 253 and 122 may be pivotally connected to the brackets 129 and 130, said brackets 129 and 130 being suitably secured together around the housings of the axle assemblies C and CA.

The air brake conduit members will be suitably extended to connect with air diaphragms 141A on the axle assembly CA which is provided with the wheel assemblies UA and DA, said wheel assemblies UA and DA being provided with the brake drums 103A in which are suitably mounted brake mechanisms operated by the above disclosed air brake mechanisms.

I claim:

1. In a vehicle, the combination of a single driving axle assembly suitably mounted, said driving axle assembly being provided with a pair of driving gear mechanisms each having a different driving speed ratio than the other of said driving gear mechanisms, a pair of engine assemblies suitably mounted, one of said engine assemblies only being operatively connected with each of said driving gear mechanisms of said single driving axle, and means for controlling each of said engine assemblies to operate at a different speed from the other of said engine assemblies when the vehicle is being driven in a straight ahead direction.

2. In a vehicle, the combination of a pair of engine assemblies suitably mounted, means for controlling said engines to operate at different rates of speed when the vehicle is moving in a straight ahead direction, a single driving axle suitably mounted and provided with a pair of independently operated driving gear mechanisms having different gear reduction ratios, a pair of wheel assemblies each operatively connected with one of said driving gear mechanisms, and means for controlling the operation of one only of said pair of engine assemblies to operate one only of said pair of wheel assemblies to drive the vehicle.

3. In a vehicle, the combination of a single driving axle assembly provided with a pair of reduction gear mechanisms each having a different gear ratio, a pair of engine assemblies suitably mounted and governed to operate at different speeds when the vehicle is being driven in a straight ahead direction, and power transmission means operatively connecting each of said pair of engine assemblies with one only of said reduction gear mechanisms of said single driving axle assembly.

4. In a vehicle, the combination of a driving axle provided with a pair of ring gears suitably mounted and each provided with a splined center portion, driving wheel assemblies suitably mounted on said driving axle, shaft members suitably mounted in said driving axle and provided with splined portions for engaging the splined portions of said ring gears, each of said shaft members being operatively connected with one of said driving wheel assemblies, pinion gears suitably mounted and operatively engaging each of said ring gears, a pair of engine assemblies operatively connected with said pinion gears, and means for permitting free wheeling operation of one of said pinion gears and one of said ring gears while both of said pairs of engine assemblies are operating.

5. In a vehicle, the combination of a single driving axle assembly suitably mounted and provided with a pair of reduction gear mechanisms, one of said reduction gear mechanisms having a slower driving speed ratio than the other of said reduction gear mechanisms, a pair of engine assemblies suitably mounted and governed to operate at different rates of speed, power transmission means operatively connecting each of said engine assemblies with one only of said reduction gear mechanisms, and free wheeling mechanism suitably mounted and forming a portion of said power transmission means operatively connecting the reduction gear mechanism having the slower driving speed ratio, with one of said engine assemblies to permit the engine assembly, operatively connected with the reduction gear mechanism having the slower driving speed ratio, to operate without exerting a driving effort, relative to said reduction gear mechanism having the slower driving speed ratio, when the vehicle has attained a predetermined road speed.

6. In a vehicle, the combination of a single axle assembly comprising a pair of axle driving mechanisms, one of said axle driving mechanisms having a slower driving speed ratio than the other of said pair of axle driving mechanisms, a pair of power units for driving said axle driving mechanisms, said pair of power units being adapted to operate at different speeds, each of said pair of power units being operatively connected with one only of said pair of axle driving mechanisms, and free wheeling mechanism operatively connected with one of said pair of power units and with said axle driving mechanism having the slower driving speed ratio, said free wheeling mechanism permitting said axle driving mechanism having the slower driving speed ratio to operate without exerting a driving effort when the vehicle has attained a predetermined speed.

7. In a vehicle, the combination of a single axle assembly comprising a pair of axle driving mechanisms, a pair of power units operatively connected with said pair of axle driving mechanisms of the single axle assembly, and means comprising a free wheeling mechanism, said means being operatively connected with one only of said pair of power units and one only of said pair of axle driving mechanisms of the single axle assembly to enable said one of said axle driving mechanisms of the single axle assembly to be operated without exerting a driving effort when the vehicle has attained a predetermined speed.

8. In a vehicle having a frame assembly comprising a main frame member extending longitudinally at the approximate center of the vehicle, the combination of a single driving axle assembly connected with the frame assembly and provided with a pair of driving gear mechanisms oppositely disposed relative to said main frame member and having different reduction gear mechanisms, said driving axle assembly being located substantially at the rear portion of the vehicle, a steering axle assembly connected with the frame assembly, said steering axle assembly being located substantially at the front portion of the vehicle, a pair of engine assemblies supported on opposite sides of said main frame member, said pair of engine assemblies being located adjacent said steering axle assembly at the front portion of the vehicle, means for controlling said pair of engines to operate at different speeds when the vehicle is travelling in a straight ahead direction, and power transmission means operatively connecting each of said engine assemblies with one only of driving gear mechanisms of said single driving axle assembly.

9. In a vehicle having a main frame member located at the longitudinal center thereof, the combination of a driving axle connected with said main frame member and having a pair of gear reduction driving mechanisms oppositely disposed relative to said main frame member, a pair of engine assemblies each operatively connected with one of said gear reduction driving mechanisms, means for controlling said engine assemblies to operate at different rates of speed, and a free wheeling mechanism operatively connected between one of said engine assemblies and one of said gear reduction driving mechanisms.

10. In a vehicle provided with a sole pair of driving wheel assemblies, the combination of a pair of means for developing driving torque simultaneously, and means for transmitting driving torque from each of said pair of means to one only of said sole pair of driving wheel assemblies, said last mentioned means comprising an overrunning mechanism operatively connected with one only of said pair of means and one only of said driving wheel assemblies to permit the other of said pair of means only to develop driving torque to drive the other of said sole pair of driving wheel assemblies to drive the vehicle.

11. In a vehicle, the combination of a single driving axle assembly provided with a pair of reduction gear mechanisms each having a different reduction gear ratio for driving the vehicle in a straight ahead direction, driving means suitably mounted and operatively connected with the pair of reduction gear mechanisms of said single driving axle assembly, means for controlling said driving means to drive said reduction gear mechanisms at a common speed, and overrunning mechanism operatively connected with said driving means and one only of said reduction gear mechanisms to prevent a portion of the driving torque developed by said driving means from being transmitted to one of said reduction gear mechanisms and to permit all of the driving torque developed by said driving means to be transmitted to the other of said reduction gear mechanisms to drive the vehicle.

12. In a vehicle, the combination of a pair of engines, a single driving axle provided with a pair of reduction gear mechanisms, a pair of power transmitting means operatively connecting each of said pair of engines with one only of the reduction gear mechanisms of said single driving axle, and free wheeling means operatively connected with one only of said pair of engines and that portion only of said means operatively connecting said one of said pair of engines with said one of the reduction gear mechanisms of said single driving axle.

13. In a vehicle, the combination of a single driving axle mounted at the rear portion of the vehicle and provided with a pair of driving wheels together with a pair of driving gear mechanisms having different reduction gear ratios, each of said driving gear mechanisms being connected with one only of said driving wheels, a pair of power plants operatively connected with the driving gear mechanisms of said single driving axle, each of said power plants being adapted for independent operation relative to the other, said pair of power plants being mounted at the forward portion of the vehicle, transmission assemblies mounted on and operatively connected with each of said power plants and each provided with governing mechanisms, speed governing means mounted on each of said power plants for controlling said power plants to operate at different speeds to drive the vehicle at a given speed in a straight ahead direction, and driving means connecting each of said speed governing means on said pair of power plants with one of said governing mechanisms of said transmission assemblies.

14. In a vehicle, the combination of an axle provided with a pair of reduction gear mechanisms mounted therein and having different gear ratios, a pair of driving wheels mounted on said axle, driving shafts operatively connected with each of said reduction gear mechanisms and one of said driving wheels to enable said reduction gear mechanisms to drive said wheels, a pair of engines operatively connected with said pair of reduction gear mechanisms and adapted to drive said reduction gear mechanisms at different speeds to operate said driving wheels at a common speed, a pair of clutches each operatively connected with one of said pair of engines and one of said reduction gear mechanisms, and free wheeling mechanism operatively connected with one of said pair of engines and one of said reduction gear mechanisms to enable one of said pair of engines to drive one only of said pair of reduction gear mechanisms to drive the vehicle without declutching said pair of clutches relative to said pair of engines.

15. In a vehicle having a main frame member extending longitudinally at the approximate center of the vehicle, the combination of a single driving axle assembly provided with a pair of reduction gear mechanisms oppositely disposed relative to said main frame member, a pair of driving wheel assemblies mounted on said single driving axle assembly, shaft members extending between each of said reduction gear mechanisms and one of said driving wheel assemblies to enable said reduction gear mechanisms to drive said driving wheel assemblies, a pair of engines mounted on and oppositely disposed about said main frame member, a pair of clutches each operatively connected with one of said pair of engines, propeller shaft mechanism operatively connecting each of said pair of engines, together with one of said pair of clutches, with one of said reduction gear mechanisms, and free wheeling mechanism operatively connected with one of said pair of engines, together with one of said pair of clutches, and one of said reduction gear mechanisms to enable one of said pair of engines to drive one of said reduction gear mechanisms to drive the vehicle while the other of said pair of engines is operating without driving the other of said reduction gear mechanisms, said driving of the vehicle by one of said pair of engines being accomplished without declutching said pair of clutches relative to said pair of engines.

HUGH JOSEPH DILLON.